UNITED STATES PATENT OFFICE.

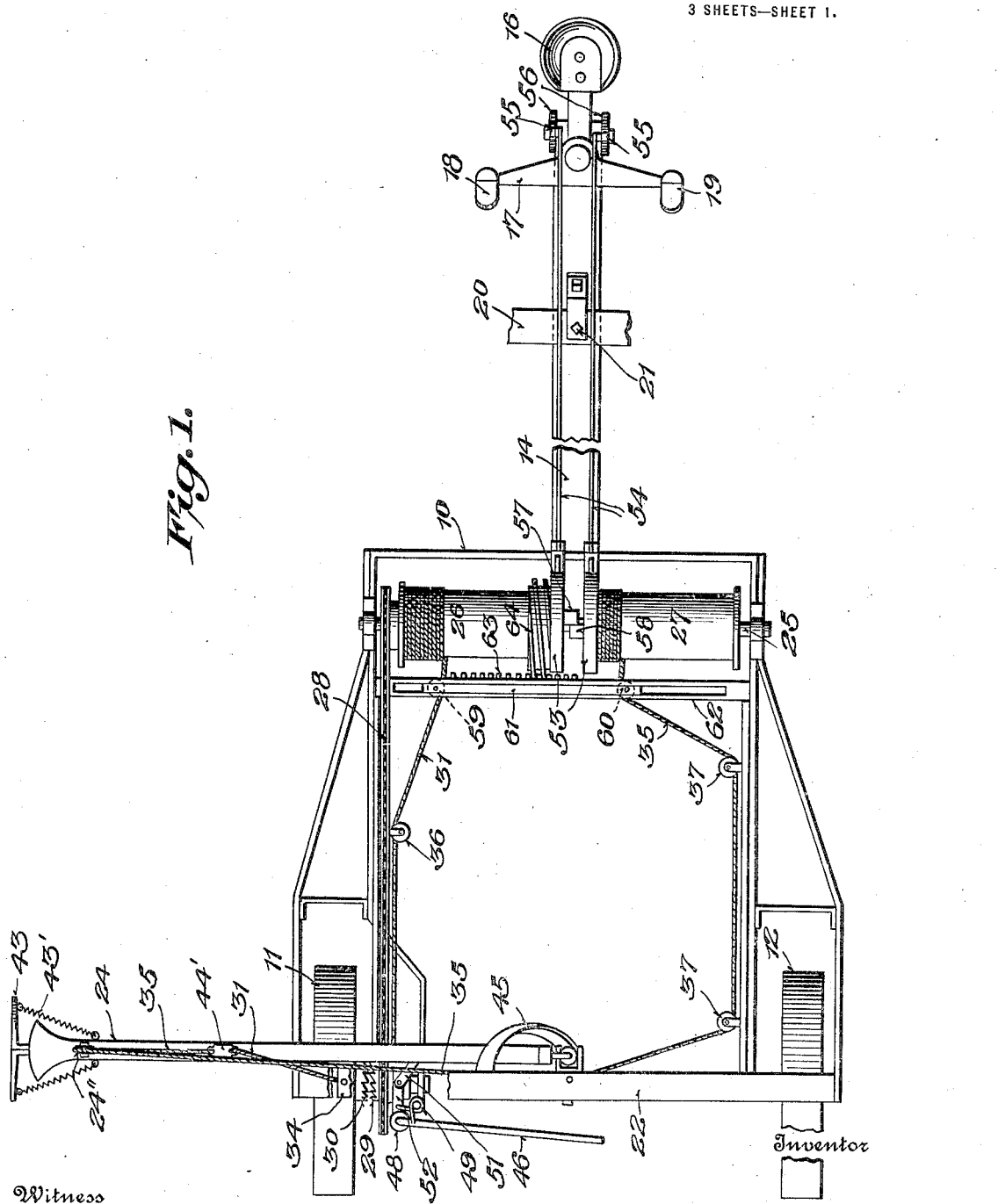

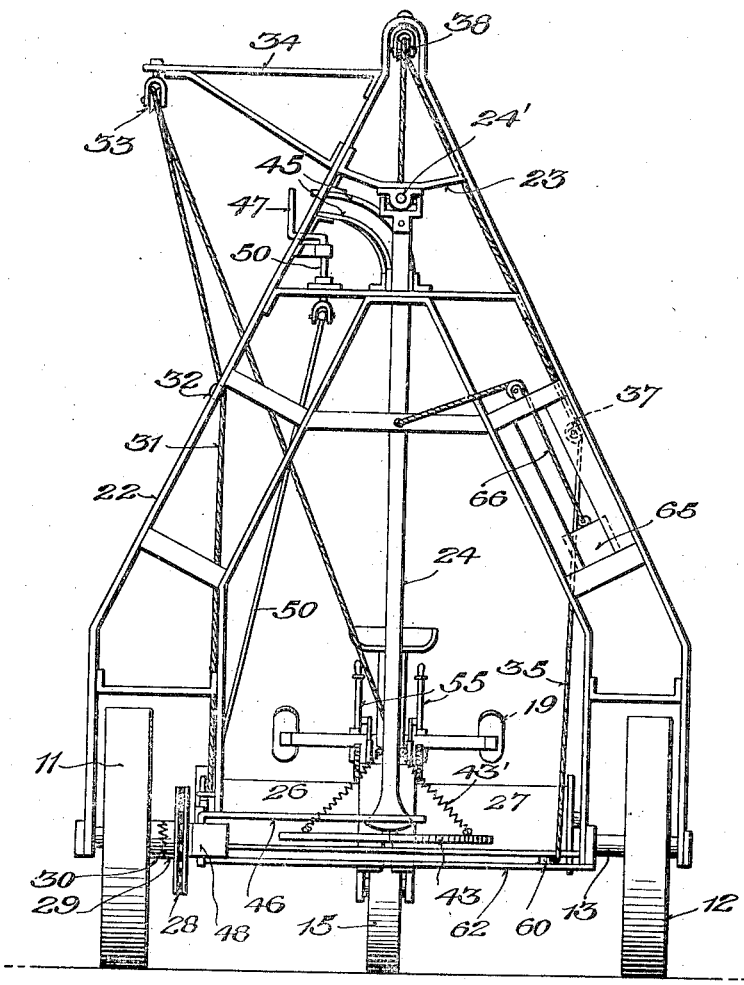

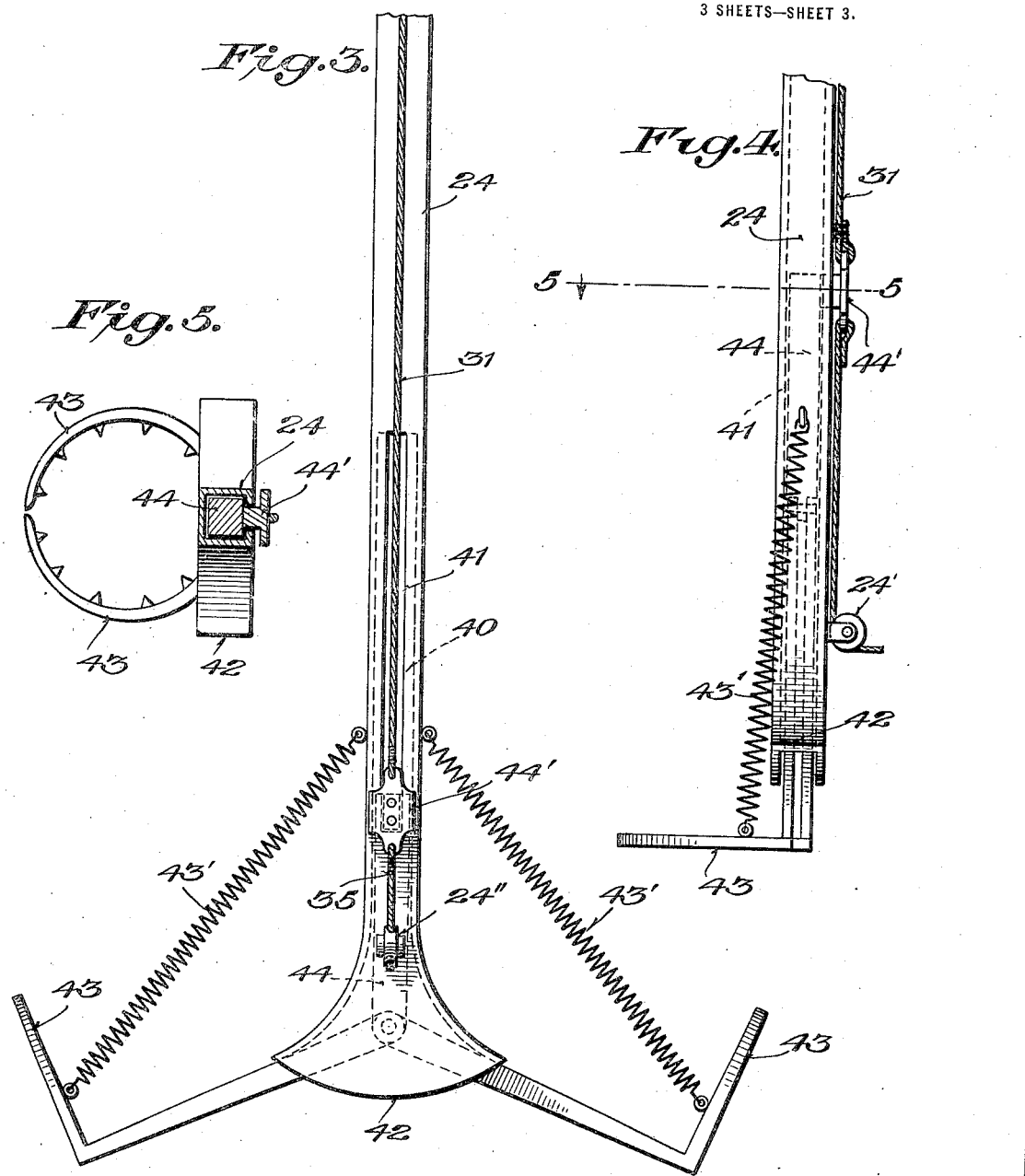

WILLIS C. HILL, OF PHILADELPHIA, PENNSYLVANIA.

SHOCK-LOADER.

1,342,959.          Specification of Letters Patent.          Patented June 8, 1920.

Application filed August 15, 1919. Serial No. 317,730.

*To all whom it may concern:*

Be it known that I, WILLIS C. HILL, a citizen of the United States, residing at Philadelphia, in the county of Philadelphia and State of Pennsylvania, have invented a certain new and useful Improvement in Shock-Loaders, of which the following is a specification.

The object of this invention is to provide an improved construction for a machine for picking up shocks of grain, corn and the like and depositing them on a wagon.

A further object of this invention is to provide improved means for operating a shock-engaging fork from engaging to depositing position.

A further object of this invention is to provide improved revolving drums for controlling the movements of the boom carrying the shock-engaging fork and also an improved cable guide to the drums.

A further object of this invention is to provide improved shock-tripped means for throwing into gear the revolving drums to initiate the movement for picking up the shock.

My invention consists in the construction, arrangement and combination of elements hereinafter set forth, pointed out in my claims and illustrated by the accompanying drawings, in which—

Figure 1 is a plan of my improved machine, portions being broken away for clearness and the boom and fork being shown in position for depositing a shock; Fig. 2 is a front elevation of the same; Fig. 3 is a rear elevation, on an enlarged scale, showing the end of the boom and the fork carried thereby; Fig. 4 is a side elevation of the same; and Fig. 5 is a transverse section through the boom on line 5—5 of Fig. 4.

In the construction of the machine as shown the numeral 10 designates generally a horizontal frame supported at its forward end by wheels 11, 12, rotatably mounted on short axles 13. A beam 14 is fixed to and extends rearwardly from the rear central portion of the frame 10, and a caster 15 is swiveled in the rear portion of said beam and supports the rear end thereof, the stem of said caster projecting through and being rotatable in said beam. A driver's seat 16 is carried by the rear end of the beam 14, and a cross-head 17 is transversely arranged on said beam and embraces and is fixed to the projecting upper end of the caster stem. Foot rests 18 and 19 are carried on opposite ends of the cross-head 17 and are adapted to be engaged by the feet of the driver occupying the seat 16. Pressure may be exerted on said foot rests to oscillate the cross-head and steer the machine by turning the caster 15. Double-tree 20 is pivoted at 21 to the beam 14 for attachment of draft animals to propel the machine.

An upright frame 22 is fixed to and rises from the forward end portion of the horizontal frame 10, and said upright frame preferably tapers in width toward its upper end. A cross-bar 23 is carried by and spaced below the top of the upright frame 22. A boom 24 has one end pivotally connected by a universal joint 24' to the cross bar 23 said boom being of sufficient length to reach approximately to the horizontal level of the axles 13, when in depending position as shown in Fig. 2.

A spindle or shaft 25 is mounted transversely of the rear portion of the horizontal frame 10, and drums 26 and 27 are arranged end to end and adapted for rotation on said spindle. A sprocket wheel is fixed to the outer end of the drum 26 and is operatively connected by a sprocket chain 28 to a sprocket wheel fixed to a clutch member 29 which is loosely mounted on the axle 13 adjacent the wheel 11, and adapted to be moved into engagement with a coacting clutch member 30 fixed to said wheel. When the clutch member 29 is in engagement with the clutch member 30 the drum 26 is rotated during advance of the machine through the sprocket gearing described. A rope 31 is fixed at one end to and adapted to be wound on the drum 26 which rope or cable extends forwardly from the drum over guide pulley 36 and upwardly around a guide pulley 32 carried by the upright frame 22, thence around a supporting pulley 33 which is carried by a bracket 34 that projects laterally from the upper end of the upright frame 22. A second rope 35 is fixed at one end to the drum 27 and extends forwardly and upwardly around guide pulleys 37, thence upwardly and inwardly around a supporting pulley 38 carried by the top of the upright frame 22, and thence about a pulley 24'' on the free end of the boom 24.

This arrangement of guide pulleys 36 and 37 confines the cables to the sides of the U- shaped frame 10 whereby greater space is afforded within the frame for the shock as it swings backwardly and upwardly.

The lower or free end portion of the boom is tubular as indicated at 40, and is lengthwise slotted at 41 in the rear side. This tubular portion opens into a flattened, flaring mouth 42 in which operate the shanks of shock-gripping jaws 43 that extend at right angles to their shanks. A block 44 is slidable in the tubular boom and has the jaw shanks pivotally connected thereto whereby when the block is moved inwardly the jaws will be closed and upon reverse movement the jaws will open. A head or lateral extension 44 projects from the block through the slot 41 and to this extension the two cables 31 and 35 are connected for actuating the slide block.

The path of upward travel of the boom is defined by a pair of curved guides 45 between which the boom moves from a vertical pendent position to a lateral horizontal dumping position. The clutch part 29 is shifted automatically into and out of clutching relation with part 30 by a pair of trips 46 and 47. The lower trip 46 is pivoted in a bracket 48 and extends therefrom above the shock gripping jaws to be engaged by a shock as it enters between the jaws. Continued advancing movement of the loader effects a backward swinging of the trip and a shifting of the clutch part 29 to operative position. A spring 49 returns the trip 46 to normal position.

The sprocket chain connection then drives the drums to wind the cables 31 and 35. As the boom approaches the depositing position it engages the upper trip 47 which is connected to a flexible rock shaft 50 having a crank arm 51 connected to the yoke 52 for disengaging the clutch parts.

The drums are each equipped with a band brake 53 connected by link 54 to a respective lever 55 pivoted on the beam 14, and cooperating with a quadrant 56 for adjusting the brakes.

The drums 26 and 27 are independently rotatable to the extent of substantially one revolution or until the lug 57, carried on the end of the drum 26 adjacent drum 27, rotates from one side to the other of the lug 58 which is carried by the opposing end of drum 27. This provision is made for the following reason:

When the boom is normally pendent both cables are practically taut. When trip 46 shifts clutch part 29 the drum 26 immediately begins to revolve while the drum 27 idles, thus allowing cable 35 to slacken relative to cable 31. Now after the boom is hoisted and ready to deposit its load, drum 27 is braked and drum 26 released to permit the weight of the shock opening the jaws to deposit the shock. Consequently the drum 26 will unwind until the lug 57 returns to the initial side of lug 58 while the cable 35 holds the boom rigid or practically so.

The cables 31 and 35 are guided onto the drums by the respective guide pulleys 59 and 60 which are rotatably carried on a slide 61, the latter being slidably supported in a cross bar 62 of frame 10. This slide member is disposed in advance of the drum and is provided with a rack 63 with which meshes a worm 64 secured to the drum 26 so that as the drums rotate the cable guide will be shifted laterally to direct the cables for even winding about the drums.

The operation is clear from the foregoing which may be recapitulated as follows:

With the boom pendent, being steadied by the weight 65 guided in the upright frame and connected to the boom by a cable 66, the loader is propelled toward a shock which, when entering the jaws, will trip the lever 46 to engage the clutch parts and result in an elevation of the boom. On approaching its upward limit of movement, the boom contacts the trip 47 to disengage the clutch parts subsequent to which the drum 27 is braked to permit of limited unwinding of cable 31 for releasing the shock.

To aid the opening of the jaws and the releasing of the shocks, springs 43' are connected to the jaws from the boom and exert an outward pull on the jaws to open the same. These springs furthermore steady the jaws when fully opened and maintain them in such position.

What is claimed is:

1. A shock loader comprising a normally pendent boom, guided weight means for steadying the same, means for swinging the boom upwardly, automatically operated means for rendering the second means operative when a shock is engaged and rendering said second means inoperative at the limit of upward swing of the boom, and means for guiding the boom laterally during its swinging movement.

2. A shock loader comprising a normally pendent boom, guided weight means for steadying the same, means for swinging the boom upwardly, said second means including a drum, and cable windable thereon, and means for guiding the cable thereon including a guide pulley and drum actuated means for shifting the pulley longitudinally of the drum.

3. A shock loader including a horizontal, wheeled frame of substantially U-design having an upright frame of inverted V-shape supported on the forward, free ends of the U-frame, a boom pivoted at its upper end to the apex of the upright frame and having its lower end normally depending between the sides of the U-frame for swinging therefrom to a laterally horizontal position, shock-carrying means mounted on the lower end of the boom, and means for operating the boom.

4. A shock loader including a horizontal, wheeled frame of substantially U-design having an upright frame of inverted V-shape supported on the forward, free ends of the U-frame, a boom pivoted at its upper end to the apex of the upright frame and having its lower end normally depending between the sides of the U-frame for swinging therefrom to a laterally horizontal position, shock-carrying means mounted on the lower end of the boom, a track on the upright frame for guiding the boom, means for raising the boom, and a trip arranged at the upper end of the track for engagement by the boom to render the boom-raising means inoperative.

5. A shock loader including a horizontal wheeled frame of substantially U-design having an upright frame of inverted V-shape supported on the forward, free ends of the U-frame, a boom pivoted at its upper end to the apex of the upright frame and having its lower end normally depending between the sides of the U-frame for swinging therefrom to a laterally horizontal position, shock-carrying means mounted on the lower end of the boom, a track on the upright frame for guiding the boom, means for raising the boom, a trip arranged at the upper end of the track for engagement by the boom to render the boom raising means inoperative, and means for operating the shock-carrying means to grip a shock and setting the boom-raising means in operation, in succession.

6. A shock loader including a horizontal wheeled frame of substantially U-design having an upright frame of inverted V-shape supported on the forward, free ends of the U-frame, a boom pivoted at its upper end to the apex of the upright frame and having its lower end normally depending between the sides of the U-frame for swinging therefrom to a laterally horizontal position, shock-carrying means mounted on the lower end of the boom, a track on the upright frame for guiding the boom, means for raising the boom, a trip arranged at the upper end of the track for engagement by the boom to render the boom-raising means inoperative, and means for operating the shock-carrying means to grip a shock including an arm extending out into the space between the sides of the U-frame for engagement and operation by a shock.

7. A shock loader comprising a boom having a tubular end portion slotted lengthwise and opening at the extremity of the boom into a flaring mouth, a block slidable in the tubular portion and having a part extending through the slot, means engaging the block extension for sliding the same, and a plurality of jaws pivotally connected to the block and operating through the flared mouth, the latter closing the jaws when the block is moved therefrom.

8. In a shock loader, a boom having a tubular end portion terminating in a flattened, flared mouth, jaws operable through the mouth, and means for moving the jaws inwardly in the mouth.

WILLIS C. HILL.